(12) United States Patent
Campos Perez et al.

(10) Patent No.: US 11,010,520 B1
(45) Date of Patent: May 18, 2021

(54) SYSTEM AND METHOD FOR CIRCUIT SYNTHESIS USING PARTIAL BOOLEAN QUANTIFICATION

(71) Applicant: Palo Alto Research Center Incorporated, Palo Alto, CA (US)

(72) Inventors: Alexandre Campos Perez, San Mateo, CA (US); Aleksandar B. Feldman, Santa Cruz, CA (US); Johan de Kleer, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/037,122

(22) Filed: Sep. 29, 2020

(51) Int. Cl.
| | |
|---|---|
| *G06F 30/327* | (2020.01) |
| *G06F 30/33* | (2020.01) |
| *G06F 30/3323* | (2020.01) |
| *G06F 30/367* | (2020.01) |
| *G06F 30/3308* | (2020.01) |
| *G06F 117/10* | (2020.01) |
| *G06F 119/02* | (2020.01) |
| *G06F 119/16* | (2020.01) |

(52) U.S. Cl.
CPC ........ *G06F 30/327* (2020.01); *G06F 30/3308* (2020.01); *G06F 30/3323* (2020.01); *G06F 30/33* (2020.01); *G06F 30/367* (2020.01); *G06F 2117/10* (2020.01); *G06F 2119/02* (2020.01); *G06F 2119/16* (2020.01)

(58) Field of Classification Search
CPC .... G06F 30/327; G06F 30/33; G06F 30/3308; G06F 30/3323; G06F 30/367; G06F 2119/16; G06F 2119/02; G06F 2117/10

USPC .......... 716/104, 106, 107, 111, 136; 703/16
See application file for complete search history.

(56) References Cited

U.S. PATENT DOCUMENTS

| | | | | |
|---|---|---|---|---|
| 2004/0237012 | A1* | 11/2004 | Prasad | G01R 31/31835 714/724 |
| 2012/0317454 | A1* | 12/2012 | Krenz-Baath | G06F 11/263 714/739 |

OTHER PUBLICATIONS

Becker, "Satisfiability-Based Methods for Digital Circuit Design, Debug, and Optimization", Ecole Polytechique Federale De Lausanne, 2018, 127 pages. (Year: 2018).*

(Continued)

*Primary Examiner* — Phallaka Kik
(74) *Attorney, Agent, or Firm* — Shun Yao; Park, Vaughan, Fleming & Dowler LLP

(57) ABSTRACT

One embodiment provides a system and method for automated design of a computational system. During operation, the system obtains a component library comprising a plurality of computational components, receives design requirements, and builds a plurality of universal component cells. A respective universal component cell is configurable, by a selection signal, to behave as one of the computational components. The system further constructs a candidate computational system using the universal component cells, constructs a miter based on the design requirements and the candidate computational system, and converts the miter into a quantified satisfiability (QS) formula. The system generates a set of inputs that are a subset of all possible inputs of the QS formula, solves the QS formula by performing partial input expansion on the generated set of inputs to obtain at least one design solution, and outputs the at least one design solution to facilitate construction of the computational system.

20 Claims, 15 Drawing Sheets

(56) References Cited

OTHER PUBLICATIONS

Benoit, "Solving the Boolean Satisfiabilty Problem using the Parallel Paradigm", Universite D'Artois, Sep. 30, 2014, 152 pages. (Year: 2014).*
Disch et al., "Combinational Equivalence Checking Using Incremental SAT Solving, Output Ordering, and Resets", IEEE, 2007, pp. 938-943. (Year: 2007).*
Franco et al., "Algorithms for the Satisfiability Problem", School of Electronic and Computing Systems, University of Cincinnati, 2013, 144 pages. (Year: 2013).*
Heule et al., "Revisiting Hyper Binary Resolution", Springer-Verlag Berlin Heidelberg, 2013, pp. 77-93. (Year: 2013).*
Kalla, "The Boolean Satisfiability (SAT) Problem, SAT Solver Technology, and Equivalence Verification", The University of Utah, Jan. 27, 2019, 54 pages. (Year: 2019).*

\* cited by examiner

```
Algorithm 1: SELECTCOMPONENTS(B, ψ, G)
Input  : B, set of Boolean functions, basis
         ψ = (V, E, α, β, χ, ω), requirements circuit
         G, circuit topology
Output: C, set of equivalent circuits
C ← ∅
X ← {χ(v) : v ∈ V} \ {⋆}
miter, S ← CREATEMITER(ψ, G, B)
γ ← CIRCUITTOCNF(miter)
while cert ← SOLVEQBF(∃S, ∀X, γ) do
    C ← C ∪ CERTTOCIRCUIT(miter, cert)
    γ ← γ ∧ ¬cert
end
return C
```

FIG. 7A

```
Algorithm 2: GENERATECIRCUITS(B, ψ, n)
Input  : B, set of Boolean functions, basis
         ψ, Boolean circuit, requirements
         n, integer, maximal number of components
Output: C, set of equivalent circuits
C ← ∅
for k ∈ {1, 2, ..., n} do
    φ, S_C, X_C, Y_C ← CREATECELLARRAY(k)
    for p ∈ Y_C ∪ X do
        for q ∈ X_C ∪ Y do
            | φ ← φ ∪ TRISTATEBUFFER(p,q)
        end
    end
    φ ← φ ∧ MAKECONSTRAINTS(X, Y, X_C, Y_C, S_C)
    miter, S ← CREATEMITER(ψ, φ)
    γ ← CIRCUITTOCNF(miter)
    while cert ← SOLVEQBF(∃S, ∀X_A, γ) do
        | C ← C ∪ CERTTOCIRCUIT(miter, cert)
        | γ ← γ ∧ ¬cert
    end
end
return C
```

Algorithm 3: PARTIALQS SOLVER($\gamma$, $P$)

Input : $\gamma$, 2-QBF $\exists\forall$ formula
  $P$, input generator
Output: cert, outermost layer certificate, or UNSAT
$\varphi \leftarrow \top$
for $i \leftarrow P$ do
  if $i \in X$ then
    $\varphi \leftarrow \varphi \land \gamma \mid X=i$
  end
end
if cert $\leftarrow$ SOLVESAT($\varphi$) then
  return cert
end
return UNSAT

FIG. 9

SYSTEM AND METHOD FOR CIRCUIT SYNTHESIS USING PARTIAL BOOLEAN QUANTIFICATION

BACKGROUND

Field

This disclosure is generally related to automated design of computational systems (e.g., digital circuits). More specifically, it is related to a system and method that can efficiently generate a compressed circuit based on partial requirements.

Related Art

Design of physical systems can be the next frontier in artificial intelligence (AI). Providing automated tools for conceiving novel designs benefits many areas, such as analog and digital circuit design, software development, mechanical system design, and systems engineering. Automated design tools can assist human designers to better navigate complex trade-offs, such as speed versus number of transistors versus heat dissipation in an integrated circuit (IC) chip. The human designers can choose from a richer base of trade-offs, thus having the potential to provide dramatic improvements in technology.

A specific automated design problem is circuit synthesis (CS), which is the problem of designing a Boolean circuit that satisfies a given set of requirements. To minimize production cost and energy consumption, it is often preferable to find such Boolean circuits of minimal cardinality, i.e., to find a Boolean circuit that comprises a minimal number of components while still satisfying the given requirements. Previous approaches reduce such a problem to a quantified satisfiability problem and leveraging a quantified Boolean formula (QBF) solver to find a solution. However, such approaches can only provide limited scalability and applicability.

SUMMARY

One embodiment provides a system and method for automated design of a computational system. During operation, the system obtains a component library comprising a plurality of computational components, receives design requirements of the computational system, and builds a plurality of universal component cells. A respective universal component cell is configurable, by a selection signal, to behave as one of the plurality of computational components. The system further constructs a candidate computational system using the plurality of universal component cells, constructs a miter circuit based on the design requirements and the candidate computational system, and converts the miter circuit into a quantified satisfiability formula. The system then generates a set of inputs that are a subset of all possible inputs of the quantified satisfiability formula, solves the quantified satisfiability formula by performing partial input expansion on the generated set of inputs to obtain at least one design solution for the computational system, and outputs the at least one design solution to facilitate construction of the computational system.

In a variation on this embodiment, generating the set of inputs can include generating a binary covering array.

In a further variation, the system determines a strength of the binary covering array based on a desired level of accuracy of the design solution, and generates the binary covering array of the determined strength.

In a variation on this embodiment, generating the set of inputs can include randomly selecting, from all possible inputs of the quantified satisfiability formula, a predetermined number of inputs.

In a variation on this embodiment, the received design requirements of the computational system can include functional requirements specified for a subset of inputs of all possible inputs of the quantified satisfiability formula, and generating the set of inputs can include generating the subset of inputs specified by the functional requirements.

In a variation on this embodiment, converting the miter circuit into a quantified satisfiability formula can include applying a plurality of predetermined constraints.

In a variation on this embodiment, constructing the candidate computational system can include modeling connections among the plurality of universal component cells using a Boolean circuit comprising a plurality of tri-state buffers. A potential connection is modeled by an enable signal of a tri-state buffer corresponding to the potential connection, and solving the quantified satisfiability formula can include at least searching for satisfying assignments to enable signals of the tri-state buffers.

BRIEF DESCRIPTION OF THE FIGURES

FIG. 7A illustrates the pseudocode for the algorithm used to generate equivalent circuits of $\psi$ with topology G and basis B, according to one embodiment.

FIG. 7B illustrates the pseudocode for the algorithm used to generate circuits equivalent to $\psi$, according to one embodiment.

FIG. 8B illustrates a configurable component matrix created for the candidate circuit, according to one embodiment.

FIG. 9 illustrates the pseudocode for the partial quantified satisfiability (QS) solver, according to one embodiment.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the scalability and/or application problem of automated design of physical systems, or more particularly, computational systems. More specifically, when only a partial specification exists or when only a subset of the functionality of a certain requirement circuit is needed, instead of full circuit synthesis, the disclosed embodiments perform partial synthesis (PS) by limiting the requirements so that the generated circuit only needs to meet the requirements for a subset of all possible inputs. A simple heuristic approach based on combinatorial testing is used to generate a proper set of inputs. More specifically, the system can use an input generator to generate a set of inputs (either randomly or following a certain order) and performs partial input expansion to find the solution to a quantified satisfiability (QS) formula. The formula can be obtained by converting a miter circuit, which is constructed to facilitate equivalence checking between a set of system requirements and a candidate circuit. By limiting the inputs to just a subset of all possible inputs, the PS-based approach allows significant reduction in the size of solutions and provides a way to trade off solution correctness for complexity.

Automated Design of Full Circuits

The tremendous improvements made in computation, representation, and tools used for designing digital circuits have made it possible to completely enumerate design space in order to obtain the optimum design. However, this can be challenging because some design spaces can be of exponential size or even infinite. Design schemes that can efficiently explore the design space of digital circuits are needed.

The design of physical systems often materializes from requirements, specifications, and the designer's experience. A typical design process can be iterative, with versions continuously improving and being refined. Incomplete designs or the initial versions often do not meet the design requirements and the designer uses a debugging process to improve the designs. Designers often create multiple alternative designs for users or system builders to choose from. The latter process is called "design exploration."

Figure 1:
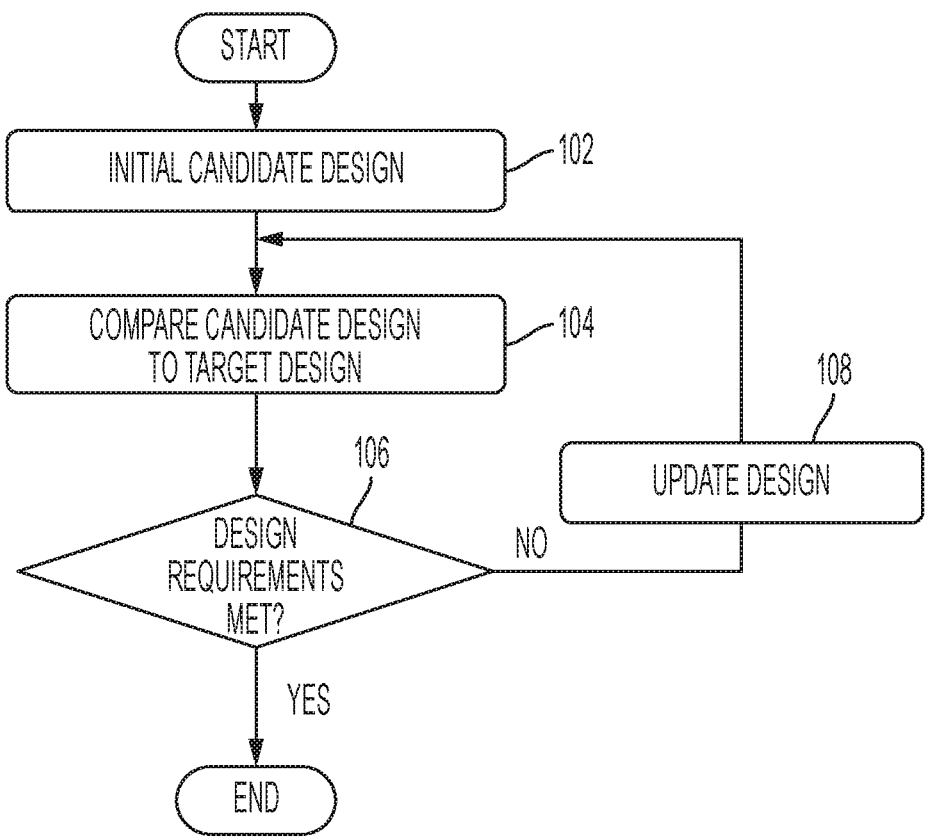
FIG. 1 shows a typical design-generation process, according to prior art.

The design specifications or requirements are called "target design." Depending on the application domain, the target design can be a mechanical blueprint, an electrical diagram, algorithmic pseudocode, or human-readable text. FIG. 1 shows a typical design-generation process. The design process typically starts with an initial candidate design (operation 102). The candidate design can be compared to the target design (operation 104) to determine whether the design requirements have been met (operation 106). If so, the design is finished. If the design requirements have not been met, the design can be updated (operation 108). The updated design can be compared to the target design again (operation 104). This process can often be assisted by computer-aided design (CAD) tools and artificial intelligence (AI) algorithms. For example, CAD tools can be used to assist the designer to generate and update the design. System simulation tools can also be used to simulate the behaviors of the designed system in order to determine whether the design meets the design requirements. In certain situations, especially in cases of designing digital systems, it is possible to consider and exhaustively search the whole design space. However, many algorithms attempting to extensively search the design space often suffer from the combinatorial explosion problem.

One way to explore the digital design space without suffering from the combinatorial explosion problem is to reduce the design problem to a quantified satisfiability problem and leverage a quantified Boolean formula (QBF) solver to find a solution. To guarantee the correctness of the solution, the QBF solver checks that the created circuit matches the given requirements for every possible set of inputs. While this guarantees that the created circuit is correct by construction, it limits not only the scalability but also the applicability of this QBF-solver-based approach. The QBF-solver-based approach is not able to handle a number of special cases, including the case where only a partial specification exists (i.e., one only knows the correct output of the desired circuit for a subset of inputs) and it is desired to generalize the design over a larger set of inputs or input values, the case where one wants to extract a subset of the functionality of a certain requirement circuit (i.e., one only cares about a subset of inputs or input values), and the case where one wants to compress a given design such that it can be implemented with a smaller set of components, at the expense of maintaining full accuracy. To overcome these challenges, in some emboidmetns, a partial synthesis approach can be used to provide solutions to the circuit design problem. The PS approach limits the requirements so that the generated circuit only needs to meet the requirements for a subset of all possible inputs.

In some embodiments, an automated design tool can reduce the problem of designing a physical system to a quantified satisfiability (QS) problem. QS is the problem of finding a satisfying assignment to a quantified Boolean formula (QBF). Algorithms that aim to solve the QS problem are called QBF solvers. Most QBF solvers expect QBF formulas to be written in prenex normal form (PNF), where all quantifiers appear before a quantifier-free formula:

$$\varphi \leftrightarrow Q_1 X_1 \square Q_2 X_2 \ldots Q_n X_n \square \varphi', \quad (1)$$

where $Q_1, Q_2, \ldots, Q_n$ are either existential ($\exists$) or universal ($\forall$) quantifiers and $X_1, X_2, \ldots, X_n$ are disjoint sets of propositional variables. Every quantified formula can be converted into an equivalent formula in prenex normal form. One way that QBF solvers approach the QS problem is through expansion-based quantifier elimination, such as the technique based on Shannon expansion, exemplified by the following equivalences:

$$\exists \{x\} \square \varphi \leftrightarrow \varphi|_{x=0} \vee \varphi|_{x=1}, \quad (2)$$

$$\forall \{x\} \square \varphi \leftrightarrow \varphi|_{x=0} \wedge \varphi|_{x=1}. \quad (3)$$

The notation $\varphi|_{x=c}$ means that the binary variable x is replaced with constant c throughout $\varphi$. The expansion-based quantifier elimination strategy is applied successively to the innermost quantifier in a formula until only one quantifier remains. If the remaining quantifier is existential ($\exists$), the formula can be checked for satisfiability on a SAT solver. In the case of a universal quantifier ($\forall$), the formula is negated to become existential, relying on the known equivalence $\forall X.\varphi \leftrightarrow \neg \varphi$.

A circuit synthesis problem can be defined as follows: given a basis B (e.g., a set of Boolean functions, referred to as a component library) and a requirement circuit (or target circuit) $\psi$, the automated design system can generate an optimal and equivalent circuit (or all optimal and equivalent circuits) $\varphi = \langle V, E, \alpha_i, \alpha_o, \beta, \chi, \omega \rangle$, where $\langle V, E \rangle$ is an acyclic digraph, $\alpha_i: E \rightarrow \square$ is an injective function, $\alpha_o: \exists \rightarrow \square$ is a non-injective and a non-surjective function, $\beta: V \rightarrow B \cup \{*\}$, $\chi: V \rightarrow X \cup \{*\}$, and $\omega: V \rightarrow Y \cup \{*\}$; X and Y are sets of inputs and outputs. That is, $\varphi \equiv \psi$ and no other circuit $\varphi' = \langle V', E', \alpha'_i, \alpha'_o, \beta', \chi', \omega' \rangle$ exists such that $\varphi' \equiv \psi$ and $|V'| < |V|$.

Figure 2:
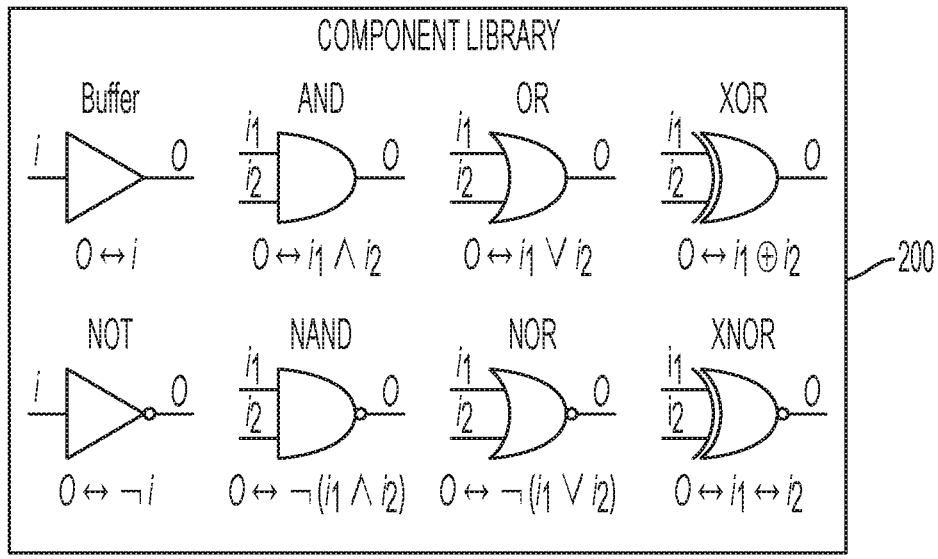
FIG. 2 illustrates an exemplary component library, according to one embodiment.
Figure 3:
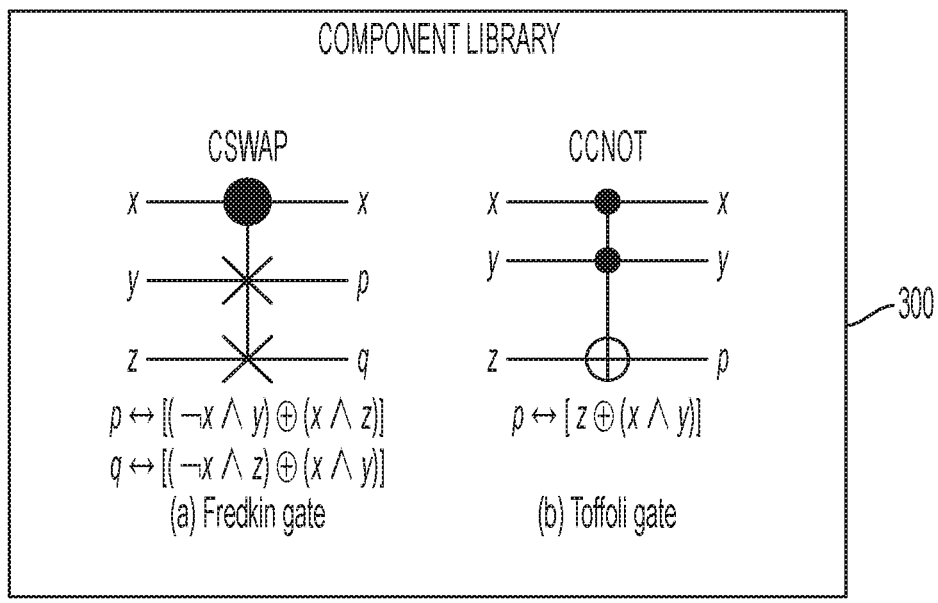
FIG. 3 illustrates an exemplary component library, according to one embodiment.

FIG. 2 illustrates an exemplary component library, according to one embodiment. More specifically, component library 200 can include a number of digital circuit gates having one or two inputs, including AND, OR, XOR, NOT, NAND, NOR, and XNOR gates. Component library 200 can also include a buffer gate. The propositional formulas associated with these gates are also shown in FIG. 2. FIG. 3 illustrates an exemplary component library, according to one embodiment. More specifically, component library 300 can include a Fredkin gate and a Toffoli gate, which are also known as CSWAP (controlled-swap) and CCNOT (controlled-controlled-not) gates, respectively. Unlike the simpler single-output gates shown in FIG. 2, both the CSWAP and CCNOT gates have multiple outputs, and the order of both the inputs and outputs matters. These gates can have applications in reversible and quantum computing.

The automated design system can also use higher-level components as basic building blocks. For example, when designing an arithmetic-logic unit (ALU), the component library can include, in addition to standard logic gates, adders, multipliers, barrel shifters, etc.

Given a circuit topology $G = \langle V, E, \chi, \omega \rangle$, to generate a full $\varphi$ circuit, one needs to assign components from basis B to every vertex (i.e., $\beta$) as well as establish the ordering of their inputs and outputs (i.e., $\alpha_i$ and $\alpha_o$, respectively). In some embodiments, the automated design system implements universal component cells to represent the various components in its component library.

A universal component cell can be a Boolean circuit that can be configured to perform as any one of the gates in a component library (e.g., component library 200 or 300 shown in FIG. 2 or FIG. 3, respectively). In some embodiments, universal component cells can be constructed dynamically by the automated digital design system depending on the content of the component library and the number of inputs and outputs.

Figure 4:
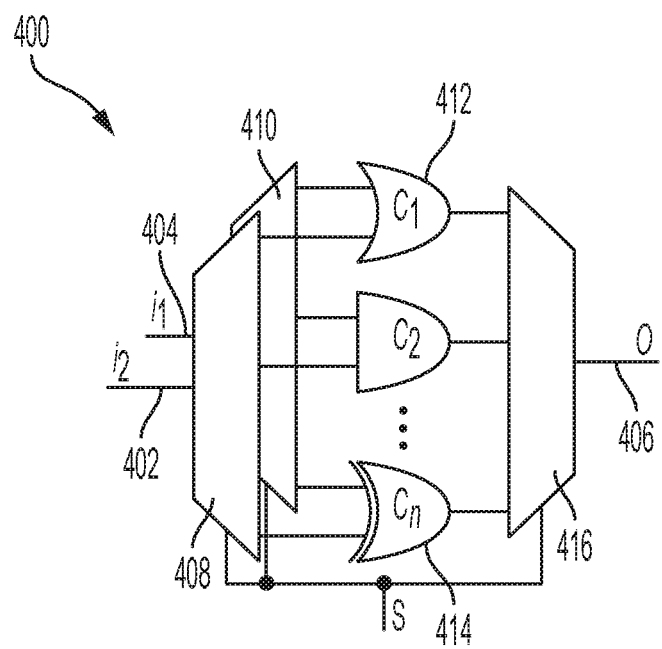
FIG. 4 illustrates an exemplary universal component cell, according to one embodiment.

FIG. 4 illustrates an exemplary universal component cell, according to one embodiment. Universal component cell 400 can include a number of input wires (e.g., input wires 402 and 404) and at least an output wire (e.g., output wire 406). Each input wire can be sent, via a demultiplexer (e.g., demultiplexer 408 or 410) to a set of components (e.g., components 412 and 414). In some embodiments, the set of components can include all components in a component library. For example, the set of components shown in FIG. 4 can include gates (e.g., the OR gate, the AND gate, the XOR gate, etc.) that belong to component library 300 shown in FIG. 3. The outputs of all components can be sent, via a multiplexer 416, to output wire 406.

Figure 5:
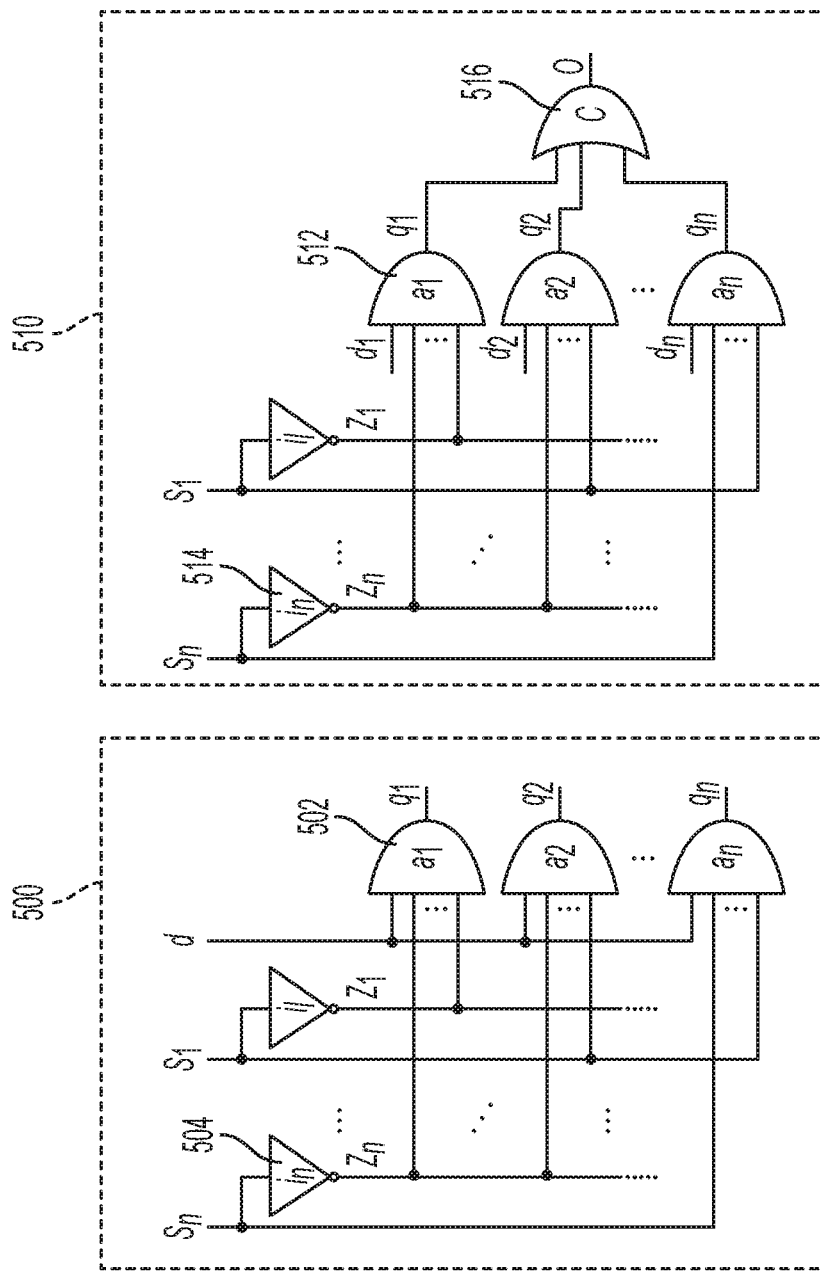
FIG. 5A shows an exemplary demultiplexer used in the universal component cell, according to one embodiment.
FIG. 5B shows an exemplary multiplexer used in the universal component cell, according to one embodiment.

By configuring the demultiplexers and multiplexers, universal component cell 400 can be configured to act as any one of the components included in the universal component cell. The configuration of universal component cell 400 can be a binary value assigned to a vector of selector lines s. The number of selector inputs is $|s| = \lceil \log_2 n \rceil$ for n distinct component types, meaning that the number of items in set s can be given as the smallest integer that is greater than or equal to $\log_2(n)$. FIG. 5A shows an exemplary demultiplexer used in the universal component cell, according to one embodiment. FIG. 5B shows an exemplary multiplexer used in the universal component cell, according to one embodiment. In the example shown in FIGS. 5A and 5B, there are n different types of gates and $|s| = \lceil \log_2 n \rceil$ selector lines. Accordingly, demultiplexer 500 and multiplexer 510 can each include n multi-input AND gates (e.g., AND gates 502 and 512) and $|s|$ inverters (e.g., inverters 504 and 514). The number of selector lines can be arbitrary, making it possible for the multiplexer or demultiplexer to work with a component library having an arbitrary number of components. All AND gates can have $|s|+1$ inputs. In addition to the selector inputs, all of the AND gates of demultiplexer 500 can also include an identical input line d. On the other hand, in addition to the selector inputs, each AND gate of multiplexer 510 can include an individual input line $d_i$, where i=1, 2, . . . , n. Multiplexer 510 can also include an OR gate 516 with n inputs. The space complexity for both demultiplexer 500 and multiplexer 510 is $O(|s| \times n)$, when the multi-input gates are realized with ladders of two-input ones.

The concept of the universal component cell can facilitate a simpler and more straightforward representation of digital circuits. All components within a digital circuit can be represented using a unified format that includes a predetermined number of inputs, a predetermined number of outputs, and the corresponding selector variable set S.

The automated design system can construct a miter, which is a circuit that checks for equivalence. The miter can be constructed from the requirement circuit and a configurable circuit—with the given topology G, where all vertices are composed of the aforementioned universal cells. A miter is responsible for connecting all primary inputs and primary outputs of the two circuits for equivalence checking.

Figure 6:
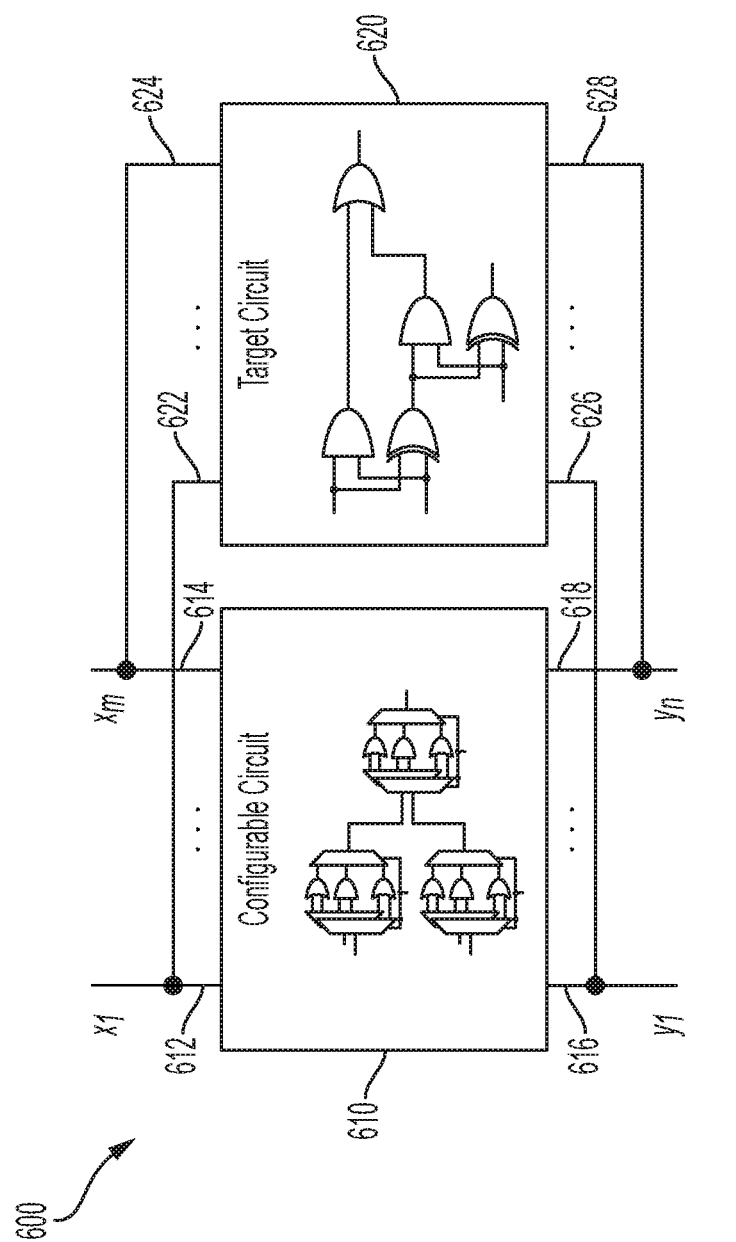
FIG. 6 shows an exemplary miter circuit, according to one embodiment.

FIG. 6 shows an exemplary miter circuit, according to one embodiment. The basic idea of a miter circuit is to relate all inputs and outputs of a candidate circuit $\phi$ and a requirement circuit (also referred to as a target circuit) v and to check for satisfiability. A conventional miter circuit uses XOR gates to compare outputs, and the two circuits have different functions if and only if the miter is satisfiable. However, such an approach does not work if the circuit variables include "don't care" values. On the other hand, the XNOR approach can be used in order to obtain the assignment of the internal variables of the candidate circuit, which provides the design solution. This can be done as a second-order QBF formula. In some embodiments, instead of implementing XNOR gates, the automated design system can generate a miter circuit by simply coupling or tying the output wires of the candidate and target circuits together, eliminating 2×|OUT| variables, where |OUT| is the number of output wires.

In some embodiments, the automated design system can generate a miter circuit 600 as shown in FIG. 6. Miter circuit 600 can include a configurable (or candidate) circuit 610 and a target circuit 620. The input wires (e.g., wires 612 and 614) of configurable circuit 610 are coupled to input wires (e.g., wires 622 and 624) of target circuit 620. Similarly, the output wires (e.g., wires 616 and 618) of configurable circuit 610 are coupled to output wires (e.g., wires 626 and 628) of target circuit 620. Note that the coupling or tying of the wires is a metaphor for the fact that the inputs and outputs of configurable circuit 610 and target circuit 620 are forced to be the same. Target circuit 620 may not be an existing circuit but a set of circuit requirements and can be represented by a truth table. The inputs of miter circuit 600 can be denoted $X=\{x_1, x_2, \ldots, x_n\}$, and the outputs of miter circuit 600 can be denoted $Y=\{y_1, y_2, \ldots, y_n\}$.

In some embodiments, all components included in configurable circuit 610 are universal component cells that can be configured to be any component in the component library. The selector lines of all universal component cells together form a variable set S. The solution of the design problem can be an assignment to all variables in S such that, for all inputs, the two circuits produce equivalent outputs. As such, the miter can be written as the QBF: $\exists S. \forall X. \phi \leftrightarrow \psi$. The two functions are equivalent if and only if the miter is satisfiable. Besides determining if a QBF is satisfiable, the QS solver is also capable of computing a partial certificate: an assignment to the variables bound to the outermost quantifier layer which either satisfies or invalidates the formula. Such a partial certificate can then be used for constructing a solution to the design problem (i.e., determining the values of S).

All of the internal variables of candidate circuit 610 and all of the internal variables of the universal component cells can be included in a variable set Z. Constructing the miter circuit (also referred to as the augmented circuit) can include, in addition to generating the miter formula, generating variable sets S and Z. The topology of candidate circuit 610 can be obtained from target circuit 620. For example, the initial topology can be similar to that of target circuit 620. In some embodiments, the system requirements are in the form of a truth table and the topology of target circuit 620 can be unknown. In such a scenario, the automated design system also needs to generate the system topology.

FIG. 7A illustrates the pseudocode for the algorithm used to generate circuits with topology G and basis B and are equivalent to v according to one embodiment. Algorithm 700 includes a subroutine (e.g., the CREATEMITER subroutine) that can be used to construct the miter circuit containing the universal cells and the requirement. The subroutine copies the target circuit and ties together each pair of corresponding primary inputs and outputs and replaces all vertices in G with universal cells. Each universal cell switches between components in B through the variables in S.

Algorithm 700 also includes a subroutine (e.g., the CIRCUITTOCNF subroutine) that is used to convert the augmented circuit (e.g., the miter) to a CNF formula γ. Subsequent to constructing the miter, algorithm 700 checks γ for satisfiability in a QBF solver subroutine (e.g., the SOLVEQBF subroutine). If satisfiable, the solver generates a certificate containing an assignment to the variables in S. Such a certificate is used to construct a circuit that is equivalent to it in a circuit-construction subroutine (CERTTOCIRCUIT). Once a consistent assignment of S is found, CNF formula γ is further constrained with the negation of the certificate, so that all possible equivalent partial assignments can be found.

A different design approach is needed when the circuit topology is not known. More specifically, a circuit with a configurable topology can be constructed by placing tri-state buffers in a two-dimensional grid, acting as an adjacency matrix. In propositional logic, a tri-state buffer is modeled as the formula $s \rightarrow (o \leftrightarrow i)$, where s acts as a selector, o is the output and i is the input. Detailed descriptions of the tri-state buffer can be found in U.S. patent application Ser. No. 16/237,429, entitled "METHOD AND SYSTEM FOR AUTOMATED DESIGN AND DESIGN-SPACE EXPLORATION," filed Dec. 31, 2018, the disclosure of which is herein incorporated by reference in its entirety.

FIG. 7B illustrates the pseudocode for the algorithm used to generate circuits equivalent to ψ, according to one embodiment. Algorithm 720 takes as input a basis B, a requirement circuit ψ, and an integer value indicating the maximal size of generated circuits, and returns a set of equivalent circuits. Algorithm 720 progressively increases the size of candidate circuits until the maximal size n is reached.

For every circuit size k, algorithm 720 first calls a subroutine (e.g., the CREATECELLARRAY subroutine) that constructs k universal cells. All inputs in the k components can be included in a set $X_c$ and all outputs in a set $Y_c$. The selector variables can be included in a set $S_c$.

Figure 8A:
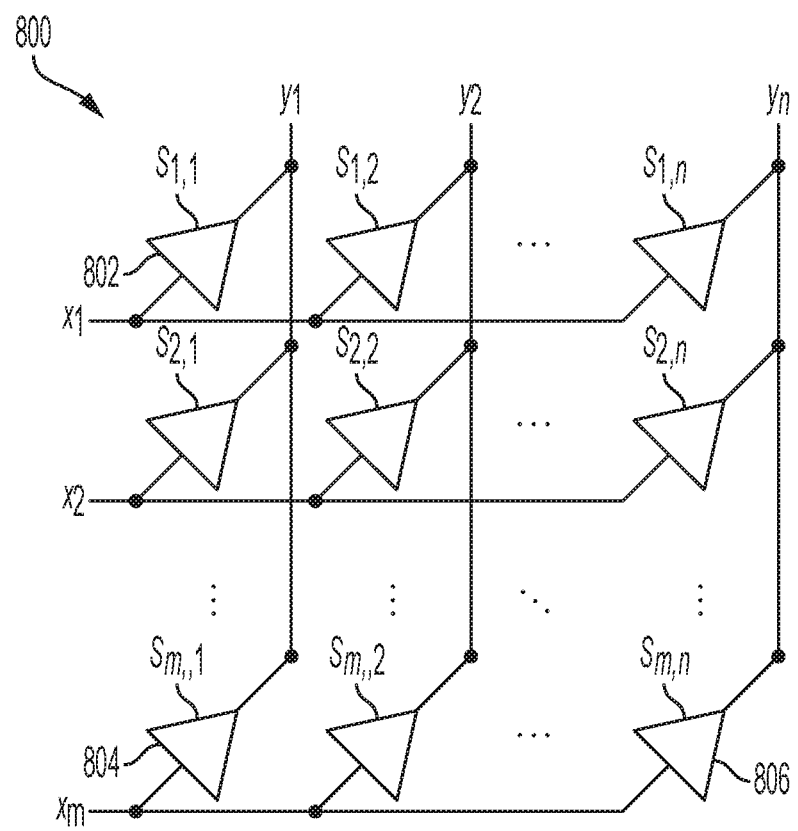
FIG. 8A illustrates an exemplary Boolean circuit modeled as an array of tri-state buffers, according to one embodiment.

The subsequent two nested loops create the configurable topology, which models the topology of the candidate circuit. To model the connections of the configurable topology, one can create a Boolean circuit by arranging a plurality of tri-state buffers into a two-dimensional (2D) grid. FIG. 8A illustrates an exemplary Boolean circuit modeled as an array of tri-state buffers, according to one embodiment. In FIG. 8A, Boolean circuit 800 can include a plurality of tri-state buffers (e.g., tri-state buffers 802, 804, and 806) that have been arranged into a 2D array. More specifically, the number of rows in the 2D array can be the number of inputs, and the number of columns in the 2D array can be the number of outputs. Each tri-state buffer can be modeled as a propositional formula $s \rightarrow (o \leftrightarrow i)$, where s is the enable signal, i the input, and o the output. The enable signal s for each tri-state buffer (e.g., tri-state buffer 802, 804, or 806) can have two values: "0" and "1," where "0" means disconnect, and "1" means connect. For example, in FIG. 8A, tri-state buffer 804 couples input $x_m$ and output $y_1$. When the enable signal of tri-state buffer 804 (i.e. $s_{m,1}$) is set as "1," input $x_m$ will be connected to output $y_1$. Similarly, when the enable signal of tri-state buffer 806 (i.e., $s_{m,n}$) is set as "0," input $x_m$ will be disconnected from output $y_n$.

Although one can build a Boolean circuit similar to Boolean circuit 800 shown in FIG. 8A for the k components included in the candidate circuit, such a circuit alone is not enough to find a design solution. This is due to the existence of the "don't care" variables. There is a trivial solution that has all tri-state buffers disabled or in "high impedance." No primary input is then connected to a primary output. The candidate circuit has no wires. This configuration satisfies the QBF formula but does not produce a "valid" circuit. The same situation occurs when the tri-state buffers in the connectivity matrix are connected in such a way that inputs and outputs in the candidate circuit are disconnected. This situation can occur due to wire loops. The component types, then, do not matter.

To ensure that the QBF solver can provide valid circuit designs, in some embodiments, the automated design system can implement a number of constraints that can avoid cycles in the topology, ensure that no primary inputs are directly connected to primary outputs, ensure that there are no floating inputs/outputs, and ensure that no two outputs are tied together. For example, algorithm 720 includes a subroutine to implement the various constraints (e.g., the MAKECONSTRAINTS) subroutine.

Figure 8B:
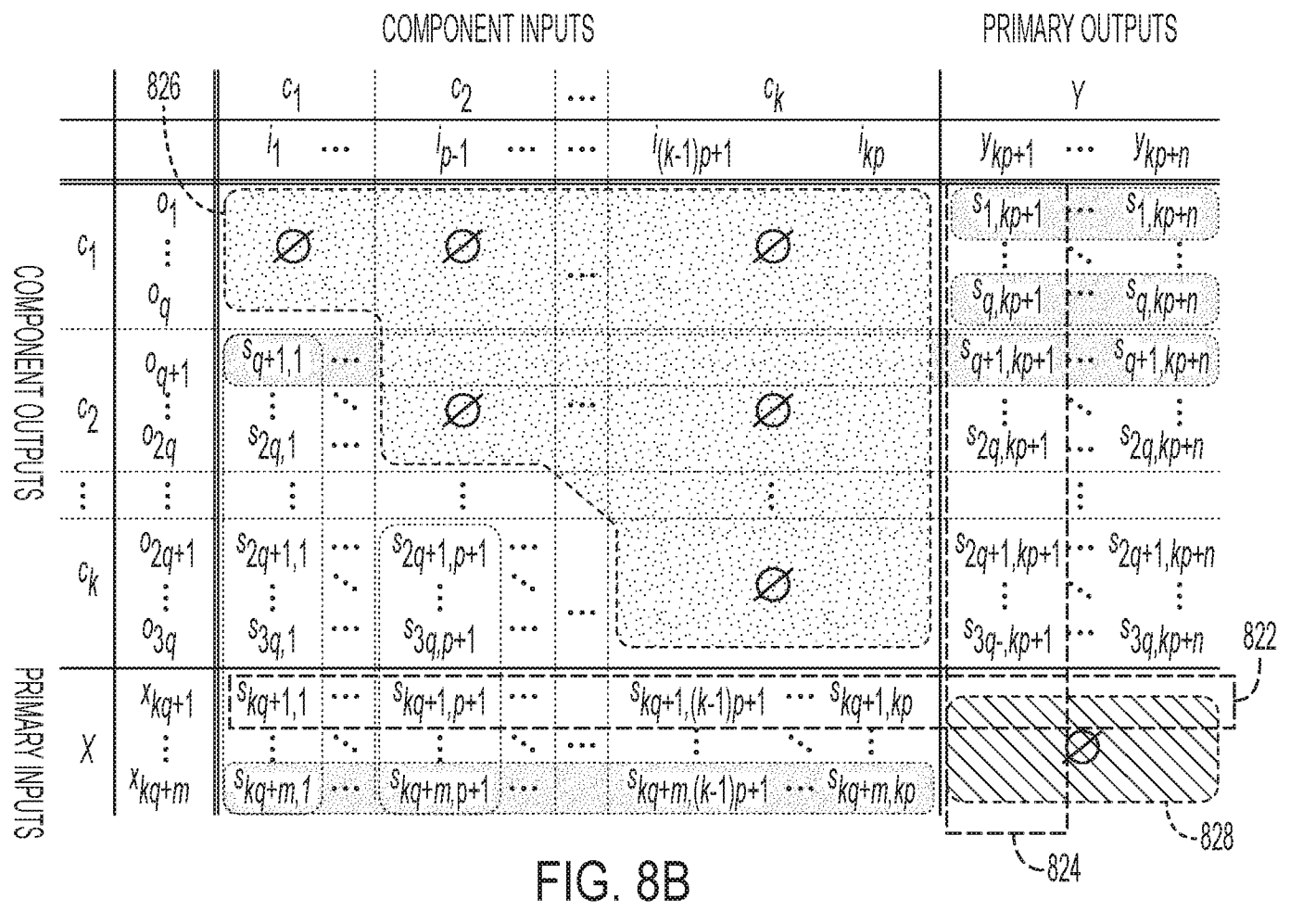

FIG. 8B illustrates a configurable component matrix created for the candidate circuit, according to one embodiment. In this example, the topology of the candidate circuit is represented as an adjacency matrix. It is also possible to represent the circuit topology as an adjacency list. In the example shown in FIG. 8B, for each of the k components, which are all universal components, there are p inputs and q outputs. As one can see from FIG. 8B, there is a row (e.g., row 822) in the matrix for each of the k universal component cell's outputs and for each primary input. Similarly, there is a column (e.g., column 824) in the matrix for each of the k universal component cell's inputs and for each of its primary outputs. This reflects the fact that the candidate circuit can be fully configurable.

FIG. 8B also shows the various constraints (e.g., forbidden connections) imposed by the automated design system on the configurable component matrix. More specifically, the constraints are indicated using Ø signs in FIG. 8B. More specifically, the Øs included in area 826 reflect the cyclic-graph constraint, and the Øs included in area 828 reflect the direct-primary-input-to-output constraint.

Returning to FIG. 7B, algorithm 720 includes additional subroutines (e.g., the CREATEMITER subroutine, the CIRCUITTOCNF subroutine, the SOLVEQBF subroutine, the CERTTOCIRCUIT subroutine) similar to those included in algorithm 700 shown in FIG. 7A.

Automated Design of Partial Circuits

Automated circuit synthesis can be challenging because one needs to verify equivalency by checking, for all inputs, that the circuit's output matches those of the requirements. Unfortunately, the number of possible sets of inputs usually grows exponentially with the number of input variables, making it difficult to scale the automated design to a large, complex system. To overcome such a challenge, in some embodiments, the automated design system can synthesize or design a circuit C that is approximately functionally equivalent to the requirements.

A partial circuit synthesis (PCS) problem can be defined by a tuple (R, B, n), where R is a requirement circuit, B is a basis, and n is a nonnegative integer. A solution to the PCS problem is a Boolean circuit that is defined over B, has the same sets of inputs and outputs as R, and there exists at least n distinct sets of inputs for which B and R output exactly the same set of outputs. Note that a solution to a PCS problem for n=100 may also be a solution for n=200. More generally, a solution to the PCS problem may actually be a solution to the corresponding full circuit synthesis (CS) problem. It is expected that solving PCS problems will be easier than solving the full circuit synthesis problem, for reasonable values of n.

A similar QBF-based scheme used to solve the full CS problem can be used to find the solution for the PCS problem. As described previously, an equivalence-checking circuit (e.g., a miter) can be constructed by coupling together inputs and outputs of the requirement circuit (or target circuit) to corresponding inputs and outputs of a configurable circuit, as shown in FIG. 6. The miter can be converted to a QBF:

$$\exists S. \forall X. \phi \leftrightarrow \psi, \quad (4)$$

where S is the set of selector variables for configuring the circuit $\phi$, X is the set of possible inputs, and $\psi$ it is the requirement circuit.

The circuit synthesis problem expressed in (4) is called a 2-QBF because it contains only two quantification layers. Hence, a quantifier elimination procedure only needs to run once. After expanding the universal quantifier, Equation (4) becomes:

$$\bigwedge_{i \in X} \phi|_{X=1} \leftrightarrow \psi|_{X=i}. \quad (5)$$

It is possible to think of each conjunct shown in (5) as a row in the truth table of v.

In some embodiments, the automated design system can solve the PCS problem by performing partial input expansion. More specifically, the 2-QBF formula ($\gamma$) can be reduced to SAT by partially expanding the innermost layer of $\gamma$. Since there are many possible partial inputs P⊆X, the automated design system can implement a partial input generator to generate a set of inputs. A partial QS solver can be used to solve the QBF.

FIG. 9 illustrates the pseudocode for the partial quantified satisfiability (QS) solver, according to one embodiment. Algorithm 900 starts with the generation of a new formula $\phi$. Then, instances of the original formula $\gamma$ with its X variables replaced with concrete inputs generated by partial input generator G (and contained in X) are appended to $\phi$. All free variables of $\phi$ therefore belong to S. Subsequently, satisfiability of $\phi$ is checked. If it is satisfiable, a SAT solver subroutine (e.g., the SOLVESAT subroutine) returns a certificate with an assignment to the free variables in S. Algorithm 900 can replace the QBF solver subroutine (i.e., the SOLVEQBF subroutine) in algorithms 700 and 720, shown in FIGS. 7A and 7B, respectively, to accomplish the task of generating partial circuits (i.e., circuits that satisfy the requirements for a subset of inputs).

Figure 10:
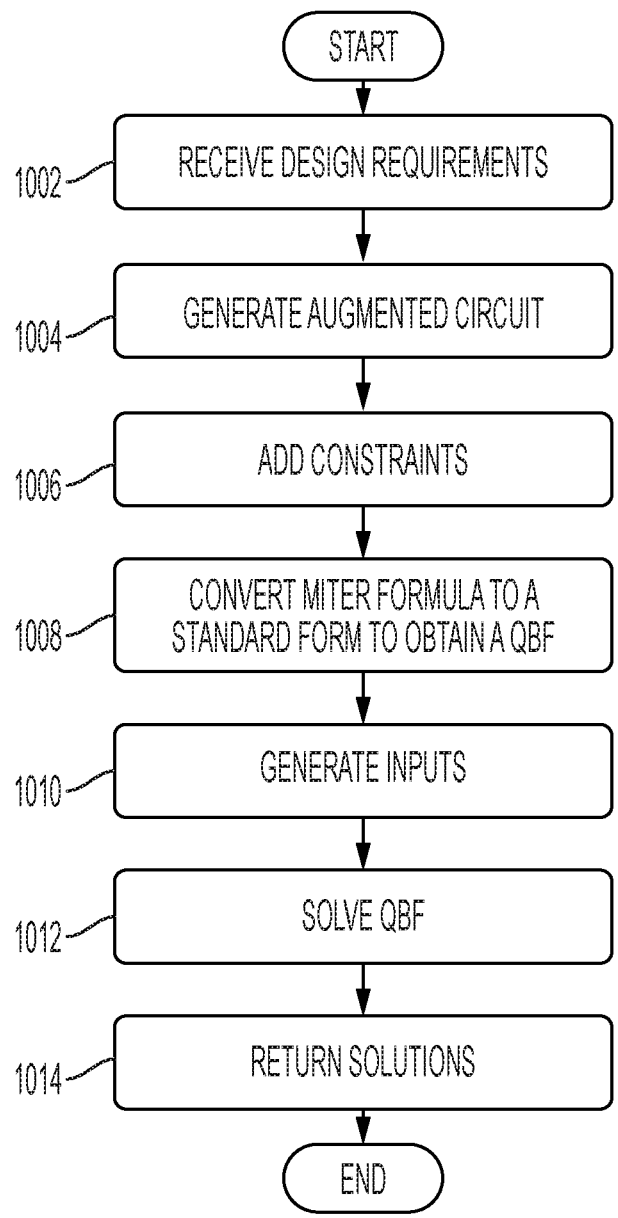
FIG. 10 presents a flowchart illustrating an exemplary process for designing a digital system based on a set of requirements and a given topology, according to one embodiment.

FIG. 10 presents a flowchart illustrating an exemplary process for designing a digital system based on a set of requirements and a given topology, according to one embodiment. During operation, the automated digital design system can receive the design requirements, which can be a requirement circuit (also referred to as a target circuit) $\psi$ or a truth table (operation 1002). The automated design system can generate an augmented circuit (operation 1004). In some embodiments, the automated design system can construct a miter circuit based on the component library, the requirement circuit, and a candidate circuit. The miter can be similar to the one shown in FIG. 6. More specifically, requirement circuit $\psi$ can provide topology information of the to-be-designed system.

Subsequent to constructing the augmented circuit, the automated design system can add a predetermined set of constraints to ensure that the designed circuit is a valid circuit (operation 1006). The design system can then convert the miter formula to a standard form $\gamma$(operation 1008). In some embodiments, the automated design system may convert the miter formula to a conjunctive normal form (CNF) in prenex normal form (PNF). Converting the miter circuit to CNF can use a naïve approach without introducing ancillary variables and can apply iteratively the De Morgan's laws of distribution of conjunction over disjunction.

The automated design system can then use a partial input generator to generate, from all possible inputs X, a subset of inputs S (operation 1010). The partial input generator can use various schemes to generate the partial input. In some embodiments, the partial input generator can randomly select, from all possible inputs X, n inputs. In alternative embodiments, the partial input generator can select, according to a certain order, the first n inputs from all possible inputs X. n can be determined based on the desired accuracy level of the circuit. A larger n can result in a more accurate circuit but will require a larger effort in finding the design solutions. Note that algorithm 900 shown in FIG. 9, in fact, checks if the generated input is part of possible inputs X; it is possible to use any generic input generator.

In some embodiments, the automated design system may also use a domain-specific partial input generator to generate input based on the specific technical domain associated with the designed circuit. For example, for an arithmetic circuit used in cryptography, it can be preferable to consider only prime numbers as inputs, instead of considering all possible numeric values as inputs. In such a situation, the partial input generator can be a prime number generator. Similarly, in situations where a particular type of input can be useful in specifying a partial set of functionality provided by the requirement circuit, the input generator can be configured to particularly generate such a type of input. Note that in certain situations, only partial requirements exist (e.g., outputs for a subset of inputs are given), and the partial input generator can be configured to generate inputs based on the partial requirement.

Figure 11:
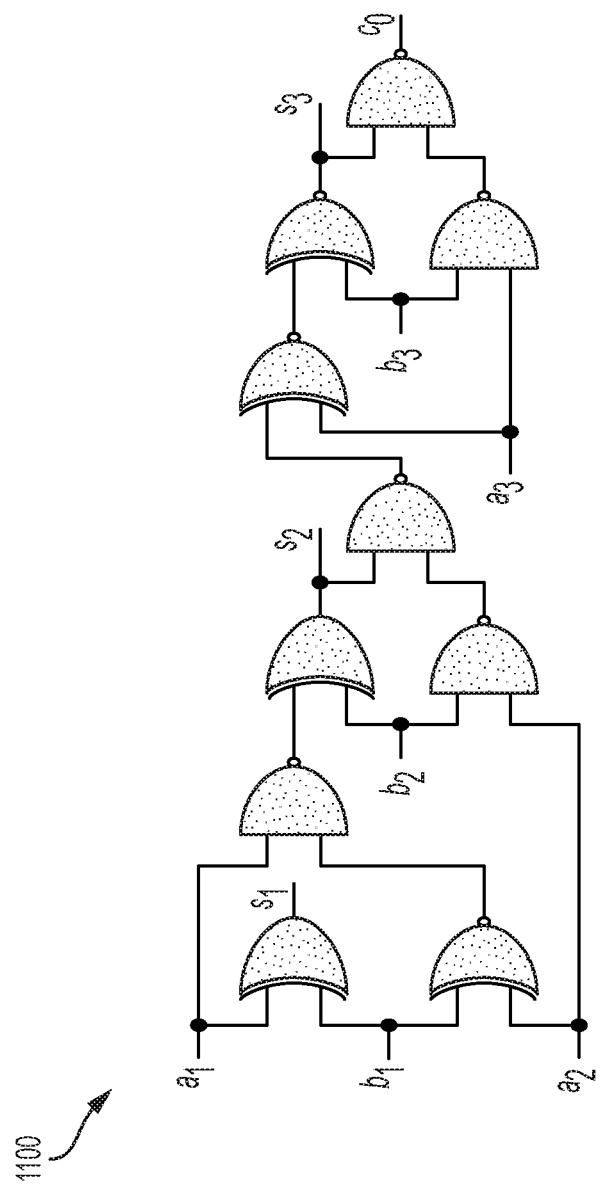
FIG. 11 illustrates an exemplary circuit designed using the partial synthesis scheme, according to one embodiment.

FIG. 11 illustrates an exemplary circuit designed using the partial synthesis scheme, according to one embodiment. In FIG. 11, circuit 1100 can include a three-bit adder. More specifically, when designing the adder, the automated design system uses a prime number generator to generate the partial input. The resulting adder includes 10 components. On the other hand, an adder designed using the full circuit synthesis scheme (i.e., by expanding inputs over all possible inputs) includes at least 15 components. Note that, when inputs are prime numbers, circuit 1100 can provide 100% accuracy. For arbitrary inputs, circuit 1100 can still provide up to 60% accuracy. In other words, limiting the inputs to prime numbers during design can significantly reduce the circuit complexity while sacrificing accuracy.

In some embodiments, the partial input generator can be configured to generate, instead of random inputs, binary covering arrays. A binary covering array BCA(t,k) is a binary-valued table with k columns in which all possible value combinations of column subsets with size t are covered. If t=0, the table contains zero rows; if t=k the covering array will produce a complete truth table with 2 k rows. Binary covering arrays play an important role in the technical domain of software engineering. For example, pairwise testing approaches use covering arrays of strength t=2 to ensure that any two components are combinatorially tested. Furthermore, empirical studies have shown that a covering array of strength t=6 can trigger all faults in buggy software from multiple diverse domains. As an example of the benefits of using covering arrays, to exhaustively cover a system composed of 10 components, one would need to test $2^{10}$=1024 possible combinations, whereas using a covering array of strength t=6 would reduce the number of tests to 173. It has been shown that, compared with random inputs, binary covering arrays can provide higher accuracy of the designed circuits. In addition, the higher the strength of the binary covering array, the higher the accuracy.

Returning to FIG. 10, the automated design system can then solve the QBF over the inputs generated by the partial input generator (operation 1012). For example, while performing the input expansion, the QBF solver only expands inputs within the input space defined by the partial input generator. The system can then return the solutions (operation 1014). Among all satisfying solutions, the solution that uses the lowest number of components can be considered as the optimal design solution.

Figure 12:
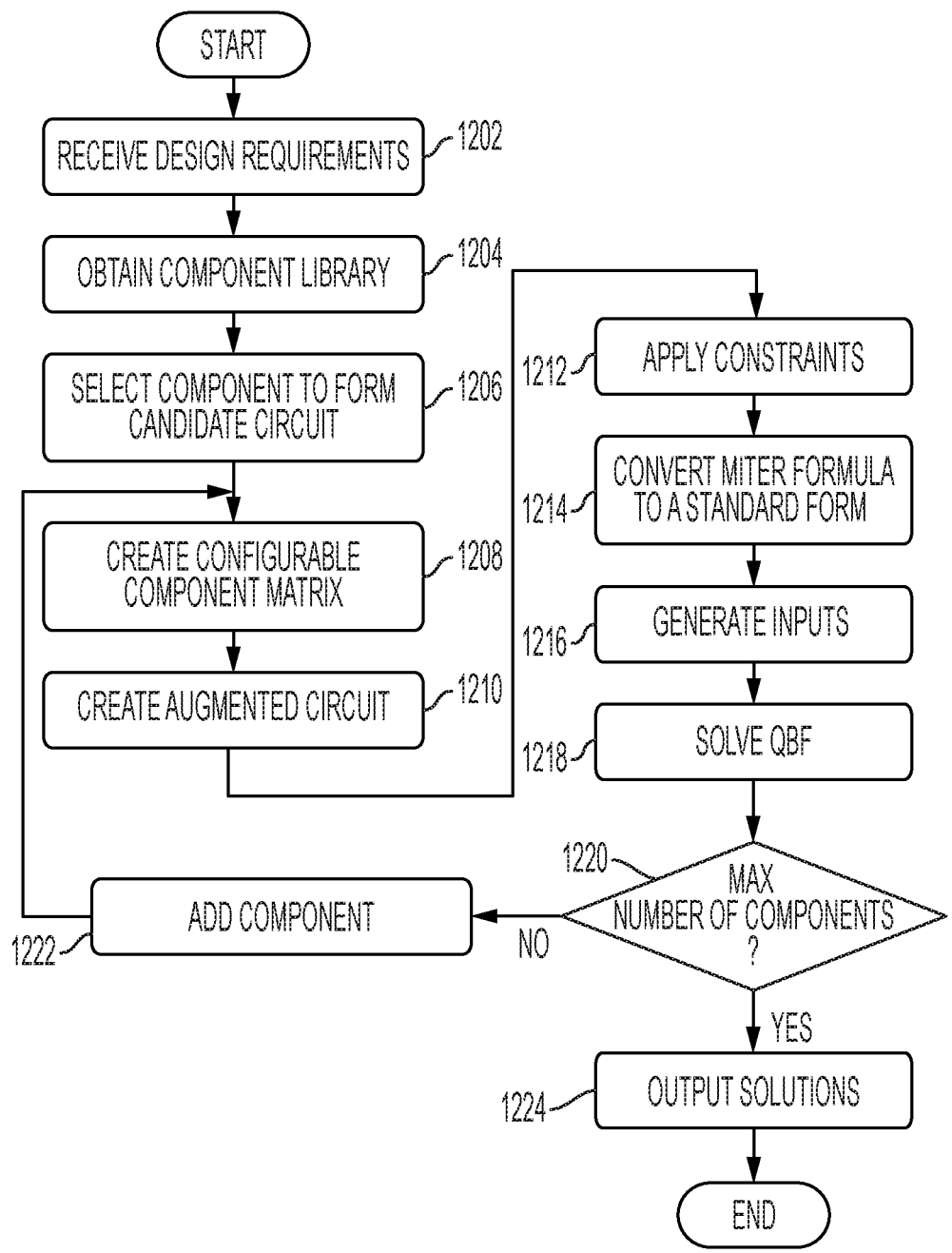
FIG. 12 presents a flowchart illustrating an exemplary automated process for designing a digital system, according to one embodiment.

When the target topology is unknown, the automated design system can construct a miter using universal cells and tri-state buffers. FIG. 12 presents a flowchart illustrating an exemplary automated process for designing a digital system, according to one embodiment. During operation, the automated design system receives the design requirements (operation 1202). The design requirements can be in the form of a known target circuit or a table describing the desired behaviors of the designed system. The automated design system can also obtain a pre-established component library (operation 1204). The component library can include universal component cells that can be configured to act as any possible component that may be needed to form the designed system. For designing digital circuits, a universal component cell can be configured to act as any one of the basic one- or two-input logic gates, including but not limited to: a buffer, an AND gate, an OR gate, an XOR gate, a NOT gate, an NAND gate, a NOR gate, an XNOR gate, etc.

The automated design system can then select one or more components from the component library to form a candidate circuit (operation 1206). For example, a candidate circuit may have k components, where 1≤k≤n and n is the maximum number of components in the designed circuit. All inputs in the k components can be included in a set $X_c$ and all outputs in a set $Y_c$. The selector variables can be included in a set $S_c$.

Subsequently, the design system can create a configurable component matrix for the candidate circuit (operation 1208). Such a configurable component matrix can also be referred to as a connectivity matrix, because it models the topology of the candidate circuit. To model the configurable component matrix, one can create a Boolean circuit by arranging a plurality of tri-state buffers into a two-dimensional (2D) grid similar to what is shown in FIG. 8A. The configurable component matrix can be similar to what is shown in FIG. 8B. When designing a partial circuit, not all primary inputs will be included in the configurable component matrix. In certain situations, the design requirement is a partial requirement that does not apply to all possible inputs, or the designer may only be interested in a subset of the functionality of the requirement circuit. It is also possible that the designer wants to design a compressed circuit that includes fewer components, even though the designed circuit may not be accurate for all inputs, as long as the designed circuit can be accurate for a subset of the inputs (e.g., over 50% of the inputs). Note that the percentage of accuracy provided by the PS approach is at least the same as the percentage of the input expansion, because, at least for the set of expanded inputs, the PS is guaranteed to produce the correct output by construction. It has been shown that, for most circuits (e.g., adders, subtractors, multiplexers/demultiplexers, multipliers, comparators, etc.), the accuracy percentage value can be larger than the percentage value of input expansion, providing a positive gain in efficiency.

Subsequent to forming the configurable component matrix, the automated design system can create an augmented circuit (e.g., a miter) based on the design requirements and the candidate circuit (operation 1210). In some embodiments, creating the augmented circuit can include expanding the component matrix to include the target circuit. The automated design system can further impose a predetermined set of constraints to the component connectivity matrix (operation 1212). The automated design system subsequently converts the miter circuit to a standard form (operation 1214). In some embodiments, the automated design system can convert the miter circuit to CNF form γ.

The automated design system can use a partial input generator to generate inputs that belong to a subset of all possible inputs (operation 1216). This operation can be similar to operation 1010 shown in FIG. 10. Depending on the practical need, the partial input generator can generate inputs randomly or according to a certain order. The partial input generator can also be configured to generate a particular type of input (e.g., prime numbers) or inputs specified by the user (e.g., the user can specify the type or range of the inputs). In one embodiment, the input generator can generate a binary covering array that can be used to find the PS solution. The combinatory strength (t) of the binary covering array can be determined based on the desired accuracy level. In general, a lower combinatory strength (i.e., a smaller t) can result in a lower accuracy, because the higher strength covering array subsumes the lower strength covering array. On the other hand, a higher strength binary covering array also means a larger input space to be explored.

The automated design system then solves the QBF over the partial input space (operation 1218). Note that the solution for the QBF will be assignments to variables S, which include both the component selection and the circuit topology information. Note that the internal variables $S_c$ determine the component selection, whereas the states of the tri-state buffers determine the circuit topology.

Subsequent to finding all satisfying solutions for a candidate circuit having k components, the automated design system determines whether a predetermined maximum number of components has been reached (operation 1220). If not, the design system can add another component to the candidate circuit (operation 1222) and then can create a configurable component matrix for the candidate circuit by arranging a plurality of tri-state buffers into a two-dimensional (2D) grid (operation 1208). If so, the design system can output the solutions (operation 1224). It has been shown that the number of components included in the PS solutions can be less than that of the full CS solutions. The smaller the set of generated inputs, the fewer the number of components in the PS solutions.

The outputted design solutions can then facilitate a system builder to build a physical system (e.g., a digital circuit). In one embodiment, an automated manufacturing system (e.g., an assembly line) can receive the design solutions and build the digital circuit based on the design solution having a minimum number of components. Alternatively, the circuit builder can choose a design solution that uses components having the least variety. In addition to digital circuits, the automated design system can also be used to design other types of computational system, such as a microprocessor, a software system, a sorting network, etc. In such scenarios, the component library can include various types of basic block used to build the computational systems. For example, when designing a software system, the component library can include computer code blocks (e.g., functions, objects, etc.).

Figure 13:
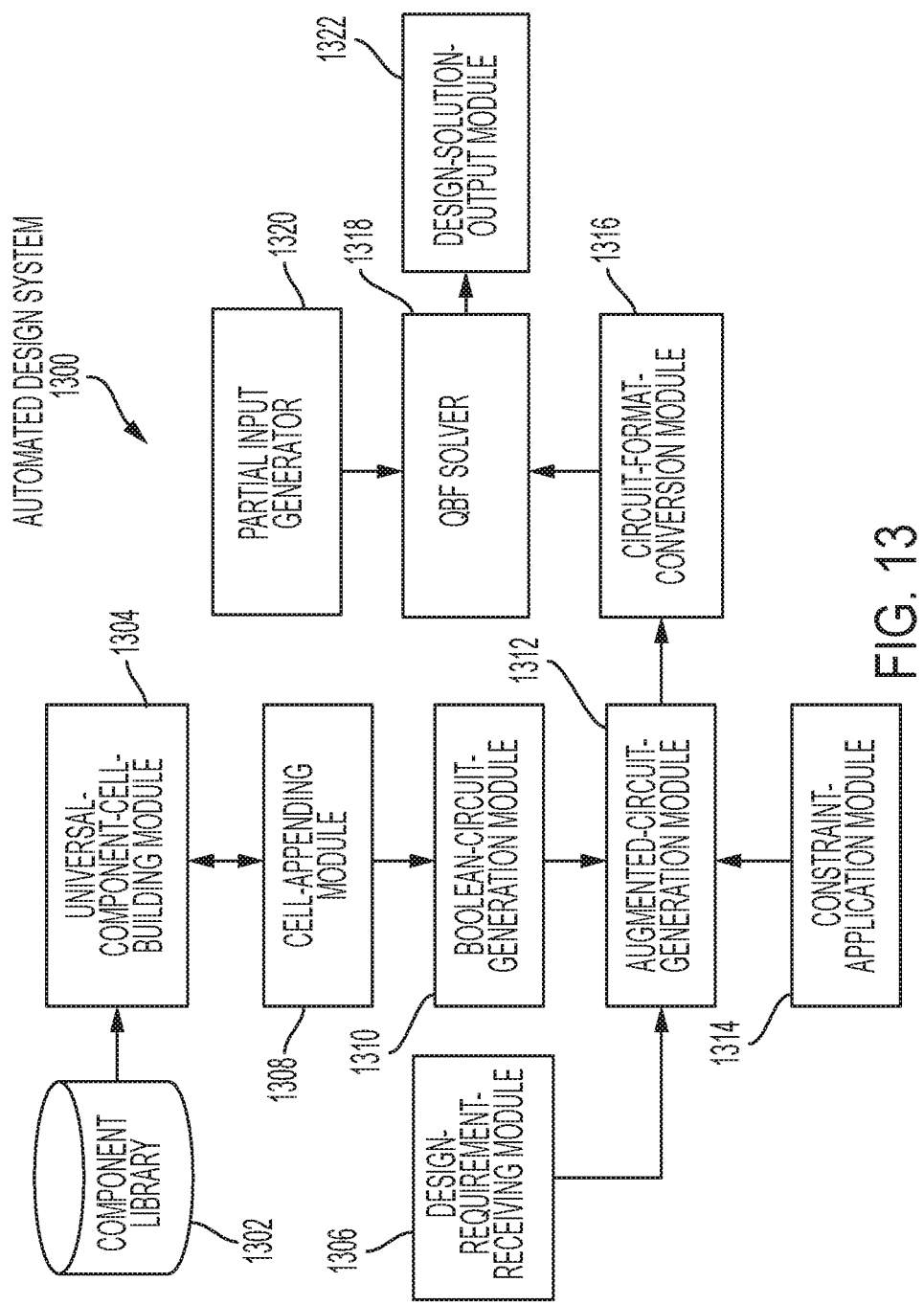
FIG. 13 presents a diagram illustrating an exemplary automated digital design system, according to one embodiment.

FIG. 13 presents a diagram illustrating an exemplary automated digital design system, according to one embodiment. Automated design system 1300 can include a component library 1302, a universal-component-cell-building module 1304, a design-requirement-receiving module 1306, a cell-appending module 1308, a Boolean-circuit-generation module 1310, an augmented-circuit-generation module 1312, a constraint-application module 1314, a circuit-format-conversion module 1316, a QBF solver 1318, a partial input generator 1320, and a design-solution-output module 1322.

Component library 1302 can include components used as basic building blocks for building a digital system, including but not limited to: digital electronic circuits, processors, reversible circuits, quantum circuits, optical circuits, computer programming, etc. Depending on the application, component library 1302 can store different types of components. In some embodiments, each component in the component library can be represented by a propositional formula. Universal-component-cell-building module 1304 can be responsible for building universal component cells based on all components stored in component library 1302. More specifically, a universal component cell can be configured to act as any one of the components within the component library. The universal component cells allow the components in a designed circuit to be defined using similar propositional formulas that are based on the inputs, the outputs, and the selection signals, thus making the encoding of the circuit much simpler. In some embodiments, each universal component cell can include demultiplexers and multiplexers that can have a variable number of inputs and outputs, similar to the ones shown in FIGS. 5A and 5B. It is also possible to implement variable input/output multiplexers/demultiplexers using other schemes.

Design-requirement-receiving module 1306 can be responsible for receiving the design requirements. In some situations, the design requirements can be presented as a Boolean circuit indicating the logical relationships among inputs and outputs or a known target circuit. In other situations, the design requirements may be presented as a truth table. In some embodiments, the design requirements can be incomplete or partial requirements.

Cell-appending module 1308 can be responsible for appending additional cells (e.g., universal component cells) to a current candidate circuit. The candidate circuit can start with a single component and can be expanded by adding one cell at a time.

Boolean-circuit-generation module 1310 can be responsible for constructing a Boolean circuit that models the current candidate circuit. In some embodiments, the Boolean circuit can be formed by arranging a plurality of tri-state buffers into a grid format. The connectivity relationship of the Boolean circuit can be represented by a configurable component matrix (also referred to as a circuit connectivity matrix).

Augmented-circuit-generation module 1312 can be responsible for generating an augmented circuit (e.g., a miter circuit) used for equivalence checking. In some embodiments, the miter circuit can be created in such a way that inputs and outputs of the candidate circuit are connected to the inputs and outputs, respectively, of the target circuit. Augmenting the circuit can also result in the expansion of the configurable component matrix.

Constraint-application module 1314 can be responsible for applying the various constraints on the target circuit. More particularly, the constraints can be applied on the configurable component matrix. These constraints can ensure that solutions found by the QBF solvers are valid circuits. Circuit-format-conversion module 1316 can convert the augmented circuit to a standard format that can be taken as input by a QBF solver. In some embodiments, circuit-format-conversion module 1316 can convert the circuit to CNF to be sent to a QBF solver 1318. Partial input generator 1320 can be responsible for generating, from all possible inputs, a subset of inputs. Design-solution-output module 1322 can output the design solutions (i.e., assignments to S and $S_c$).

Figure 14:
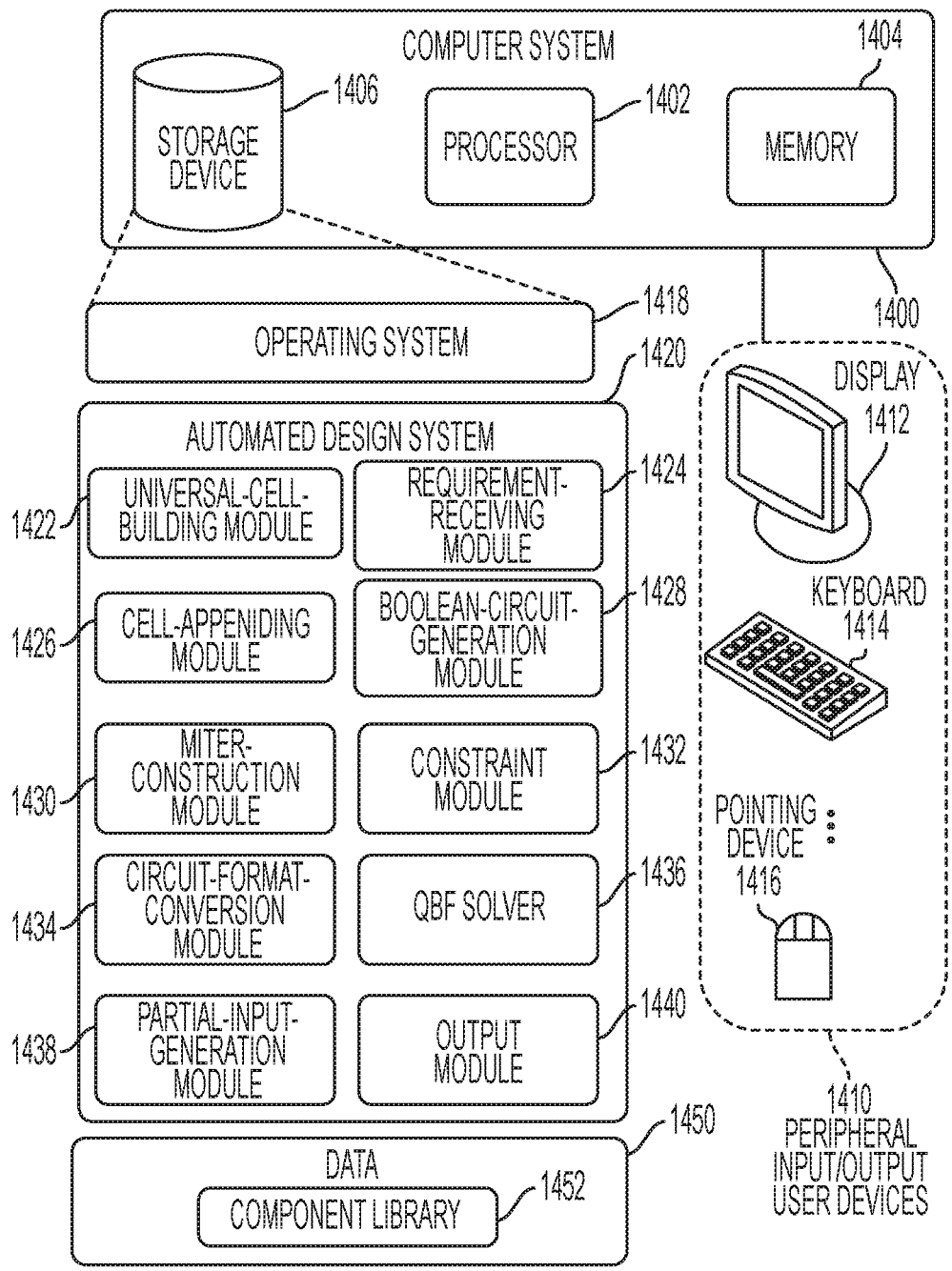
FIG. 14 illustrates an exemplary computer system, according to one embodiment.

FIG. 14 illustrates an exemplary computer system, according to one embodiment. Computer system 1400 includes a processor 1402, a memory 1404, and a storage device 1406. Furthermore, computer system 1400 can be coupled to peripheral input/output (I/O) user devices 1410, e.g., a display device 1412, a keyboard 1414, and a pointing device 1416. Storage device 1406 can store an operating system 1418, an automated design system 1420, and data 1440.

Automated design system 1420 can include instructions, which when executed by computer system 1400, can cause computer system 1400 or processor 1402 to perform methods and/or processes described in this disclosure. Specifically, automated design system 1420 can include instructions for building universal component cells (universal-cell-building module 1422), instructions for receiving requirements (requirement-receiving module 1424), instructions for appending additional cells (e.g., universal component cells) to a current candidate circuit (cell-appending module 1426), instructions for generating a Boolean circuit (Boolean-circuit-generation module 1428), instructions for constructing an augmented circuit (i.e., a miter) (miter-construction module 1430), instructions for applying constraints (constraint module 1432), instructions for converting the augmented circuit to a standard format that can be taken as input by a QBF solver (circuit-format-conversion module 1434), instructions for solving the QBF (QBF solver 1436), instructions for generating partial input (partial-input-generation module 1438), and instructions for outputting the design solution (output module 1440). Data 1450 can include a component library 1452.

Figure 15A:
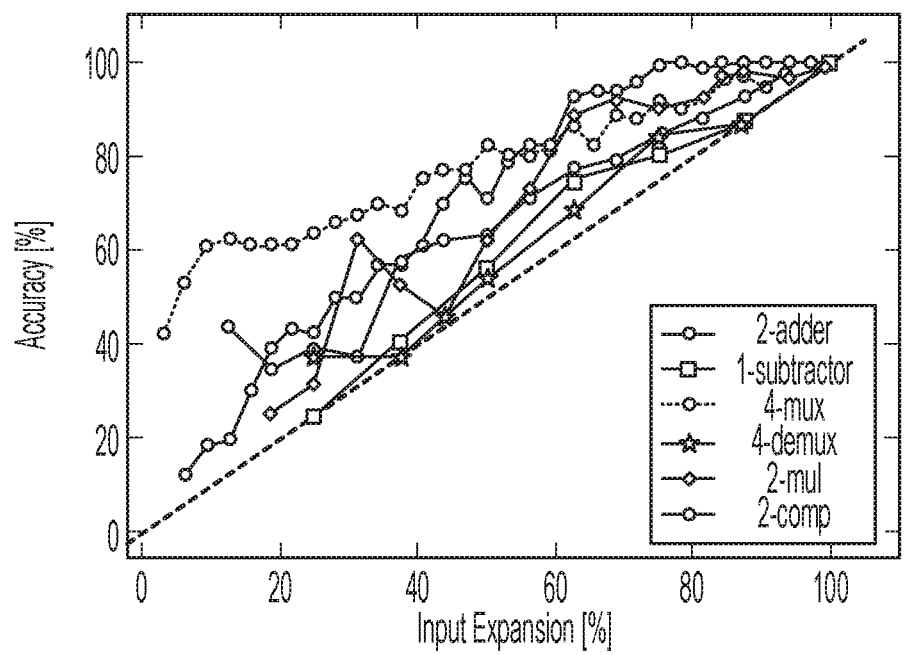
FIG. 15A shows the circuit accuracy as a function of input expansion for various types of circuit, according to one embodiment.
Figure 15B:
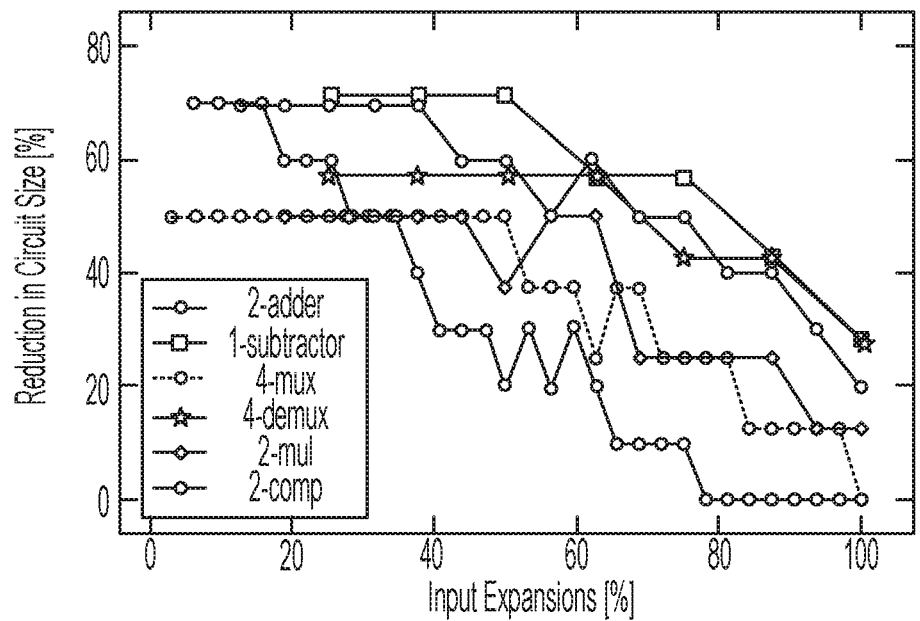
FIG. 15B shows the number of components in the designed circuits as a function of input expansion for various types of circuit, according to one embodiment.

By performing the partial circuit synthesis, instead of the full circuit synthesis, the disclosed embodiments provide a system and method that generates a design of a complex physical system more efficiently. Although limiting the input space to be explored can result in decreased accuracy (e.g., the designed circuit may not meet the requirements for certain inputs), experiments have shown that the increased efficiency outweighs the loss in accuracy. FIG. 15A shows the circuit accuracy as a function of input expansion for various types of circuit, according to one embodiment. In FIG. 15A, identity line 1502 indicates the minimum accuracy provided by the PS approach, and accuracy values above identity line 1502 indicate that the synthesized circuit produces the correct output for a subset of unexpanded inputs; and as such the circuit is capable of generalization. Results shown in FIG. 15A indicate that circuits such as n-adder and n-mux are capable of generalization, with both producing over 80% accuracy when only 60% inputs are used in synthesis. In addition to generalization, the PS approach can also result in more compact designs. FIG. 15B shows the number of components in the designed circuits as a function of input expansion for various types of circuit, according to one embodiment. As one can see in FIG. 15B, with a reduced set of inputs to be expanded, the size of synthesized circuits tends to be much smaller than their full-expansion counterparts.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for automated design of a computational system, comprising:
    obtaining, by a computer, a component library comprising a plurality of computational components;
    receiving design requirements of the computational system;
    building a plurality of universal component cells, wherein a respective universal component cell is configurable, by a selection signal, to behave as one of the plurality of computational components;
    constructing a candidate computational system using the plurality of universal component cells;
    constructing a miter circuit based on the design requirements and the candidate computational system;
    converting the miter circuit into a quantified satisfiability formula;
    generating a set of inputs that are a subset of all possible inputs of the quantified satisfiability formula;
    solving the quantified satisfiability formula by performing partial input expansion on the generated set of inputs to obtain at least one design solution for the computational system; and
    outputting the at least one design solution to facilitate construction of the computational system.

2. The computer-implemented method of claim 1, wherein generating the set of inputs comprises generating a binary covering array.

3. The computer-implemented method of claim 2, further comprising:
    determining a strength of the binary covering array based on a desired level of accuracy of the design solution; and
    generating the binary covering array of the determined strength.

4. The computer-implemented method of claim 1, wherein generating the set of inputs comprises randomly selecting, from all possible inputs of the quantified satisfiability formula, a predetermined number of inputs.

5. The computer-implemented method of claim 1, wherein the received design requirements of the computational system comprise functional requirements specified for a subset of inputs of all possible inputs of the quantified satisfiability formula, and wherein generating the set of inputs comprises generating the subset of inputs specified by the functional requirements.

6. The computer-implemented method of claim 1, wherein converting the miter circuit into a quantified satisfiability formula further comprises applying a plurality of predetermined constraints.

7. The computer-implemented method of claim 1, wherein constructing the candidate computational system comprises modeling connections among the plurality of universal component cells using a Boolean circuit comprising a plurality of tri-state buffers, wherein a potential connection is modeled by an enable signal of a tri-state buffer corresponding to the potential connection, and wherein solving the quantified satisfiability formula comprises at least searching for satisfying assignments to enable signals of the tri-state buffers.

8. A non-transitory computer-readable storage medium storing instructions that when executed by a computer cause the computer to perform a method for automated design of a computational system, the method comprising:
   obtaining a component library comprising a plurality of computational components;
   receiving design requirements of the computational system;
   building a plurality of universal component cells, wherein a respective universal component cell is configurable, by a selection signal, to behave as one of the plurality of computational components;
   constructing a candidate computational system using the plurality of universal component cells;
   constructing a miter circuit based on the design requirements and the candidate computational system;
   converting the miter circuit into a quantified satisfiability formula;
   generating a set of inputs that are a subset of all possible inputs of the quantified satisfiability formula;
   solving the quantified satisfiability formula by performing partial input expansion on the generated set of inputs to obtain at least one design solution for the computational system; and
   outputting the at least one design solution to facilitate construction of the computational system.

9. The computer-implemented method of claim 8, wherein generating the set of inputs comprises generating a binary covering array.

10. The computer-implemented method of claim 9, wherein the method further comprises:
   determining a strength of the binary covering array based on a desired level of accuracy of the design solution; and
   generating the binary covering array of the determined strength.

11. The non-transitory computer-readable storage medium of claim 8, wherein generating the set of inputs comprises randomly selecting, from all possible inputs of the quantified satisfiability formula, a predetermined number of inputs.

12. The non-transitory computer-readable storage medium of claim 8, wherein the received design requirements of the computational system comprise functional requirements specified for a subset of inputs of all possible inputs of the quantified satisfiability formula, and wherein generating the set of inputs comprises generating the subset of input specified by the functional requirements.

13. The non-transitory computer-readable storage medium of claim 8, wherein converting the miter circuit into a quantified satisfiability formula further comprises applying a plurality of predetermined constraints.

14. The non-transitory computer-readable storage medium of claim 8, wherein constructing the candidate computational system comprises modeling connections among the plurality of universal component cells using a Boolean circuit comprising a plurality of tri-state buffers, wherein a potential connection is modeled by an enable signal of a tri-state buffer corresponding to the potential connection, and wherein solving the quantified satisfiability formula comprises at least searching for satisfying assignments to enable signals of the tri-state buffers.

15. A computer system for automated design of a computational system, comprising:
   a processor; and
   a storage device storing instructions that when executed by the processor cause the processor to perform a method, the method comprising:
      obtaining a component library comprising a plurality of computational components;
      receiving design requirements of the computational system;
      building a plurality of universal component cells, wherein a respective universal component cell is configurable, by a selection signal, to behave as one of the plurality of computational components;
      constructing a candidate computational system using the plurality of universal component cells;
      constructing a miter circuit based on the design requirements and the candidate computational system;
      converting the miter circuit into a quantified satisfiability formula;
      generating a set of inputs that are a subset of all possible inputs of the quantified satisfiability formula;
      solving the quantified satisfiability formula by performing partial input expansion on the generated set of inputs to obtain at least one design solution for the computational system; and
      outputting the at least one design solution to facilitate construction of the computational system.

16. The computer system of claim 15, wherein generating the set of inputs comprises generating a binary covering array.

17. The computer system of claim 16, wherein the method further comprises:
   determining a strength of the binary covering array based on a desired level of accuracy of the design solution; and
   generating the binary covering array of the determined strength.

18. The computer system of claim 15, wherein generating the set of inputs comprises randomly selecting, from all possible inputs of the quantified satisfiability formula, a predetermined number of inputs.

19. The computer system of claim 15, wherein the received design requirements of the computational system comprise functional requirements specified for a subset of inputs of all possible inputs of the quantified satisfiability formula, and wherein generating the set of inputs comprises generating the subset of inputs specified by the functional requirements.

20. The computer system of claim 15, wherein constructing the candidate computational system comprises modeling connections among the plurality of universal component cells using a Boolean circuit comprising a plurality of tri-state buffers, wherein a potential connection is modeled by an enable signal of a tri-state buffer corresponding to the potential connection, and wherein solving the quantified satisfiability formula comprises at least searching for satisfying assignments to enable signals of the tri-state buffers.

* * * * *